United States Patent
Decker et al.

(10) Patent No.: US 11,319,055 B2
(45) Date of Patent: May 3, 2022

(54) COMPLIANT TAIL STRUCTURE FOR ROTORCRAFT

(71) Applicant: Textron Innovations Inc., Providence, RI (US)

(72) Inventors: George Ryan Decker, Fort Worth, TX (US); Andrew G. Baines, Southlake, TX (US); Frank Douglas Sauer, Duncanville, TX (US)

(73) Assignee: Textron Innovations Inc., Providence, RI (US)

( * ) Notice: Subject to any disclaimer, the term of this patent is extended or adjusted under 35 U.S.C. 154(b) by 276 days.

(21) Appl. No.: 16/558,071

(22) Filed: Aug. 31, 2019

(65) Prior Publication Data

US 2021/0061440 A1    Mar. 4, 2021

(51) Int. Cl.
| | |
|---|---|
| *B64C 5/10* | (2006.01) |
| *B64C 5/02* | (2006.01) |
| *B64C 1/26* | (2006.01) |
| *B64C 29/00* | (2006.01) |

(52) U.S. Cl.
CPC ............... *B64C 5/10* (2013.01); *B64C 1/26* (2013.01); *B64C 5/02* (2013.01); *B64C 29/0033* (2013.01)

(58) Field of Classification Search
CPC .... B64C 5/02; B64C 5/06; B64C 5/10; B64C 1/26; B64C 9/08; B64C 9/30
See application file for complete search history.

(56) References Cited

U.S. PATENT DOCUMENTS

| | | | |
|---|---|---|---|
| 2,580,176 | A | 12/1951 | Johnson |
| 2,708,081 | A | 5/1955 | Dobson |
| 3,039,719 | A | 6/1962 | Platt |
| 3,166,271 | A | 1/1965 | Zuck |
| 4,247,061 | A | 1/1981 | Kuczynski et al. |
| 5,096,143 | A | 3/1992 | Nash |
| 5,395,073 | A | 3/1995 | Rutan et al. |
| 5,549,260 | A | 8/1996 | Reed, I |
| 5,641,133 | A | 6/1997 | Toossi |
| 7,581,696 | B2 | 9/2009 | Morgan et al. |
| 8,006,932 | B2 | 8/2011 | Ruiz et al. |
| 8,342,446 | B2 | 1/2013 | Chareyre et al. |
| 9,174,731 | B2 | 11/2015 | Ross et al. |
| 9,616,995 | B2 | 4/2017 | Watkins |
| 10,023,294 | B2 | 7/2018 | VanBuskirk et al. |
| 10,124,880 | B1 * | 11/2018 | Ellzey ................. B64C 5/02 |
| 2010/0032519 | A1 | 2/2010 | Chareyre et al. |
| 2010/0148000 | A1 | 6/2010 | Sandin et al. |
| 2012/0298795 | A1 * | 11/2012 | Cazals .................. B64C 5/02 244/87 |

\* cited by examiner

*Primary Examiner* — Richard R. Green
*Assistant Examiner* — William L Gmoser
(74) *Attorney, Agent, or Firm* — Lawrence Youst PLLC

(57) ABSTRACT

A compliant tail structure for a rotorcraft having rotating components and a fuselage. The tail structure includes a tail assembly having first and second oppositely disposed tail members. A tail joint connects the tail assembly to an aft portion of the fuselage. The tail joint includes at least four tail mounts configured to establish a nodding axis for the tail assembly. At least two of the tail mounts are resilient tail mounts that are configured to establish a nodding degree of freedom for the tail assembly relative to the fuselage about the nodding axis, thereby detuning dynamic fuselage responses from excitation frequencies generated by the rotating components.

12 Claims, 6 Drawing Sheets

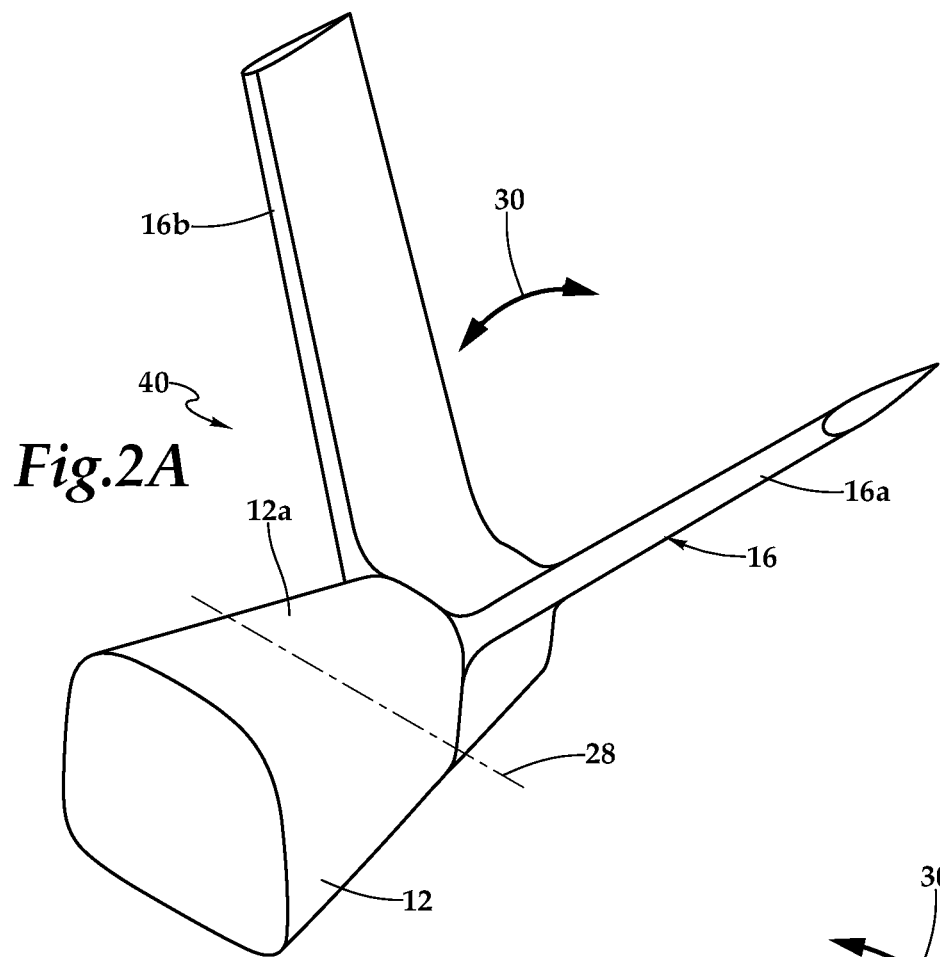
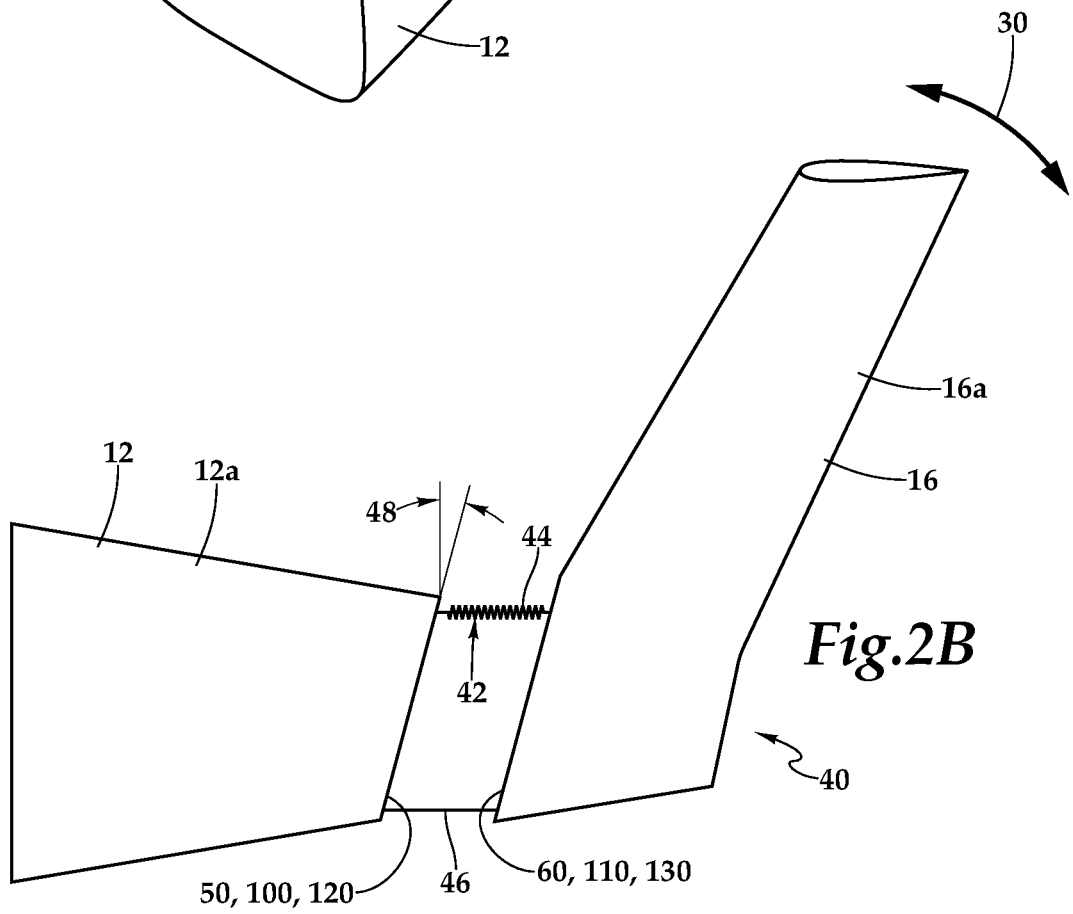

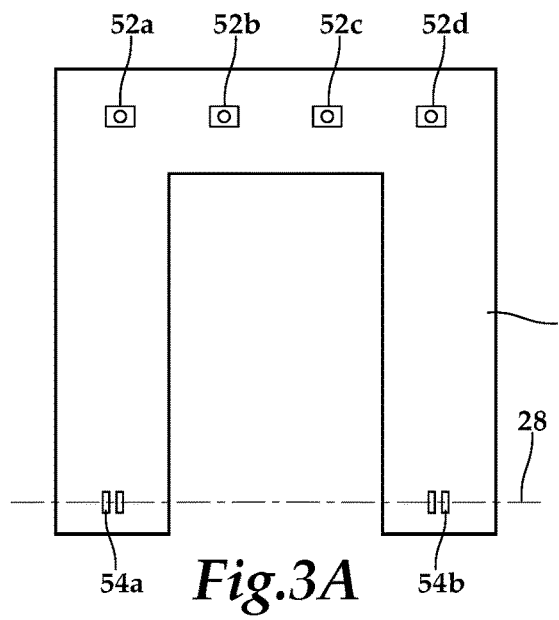 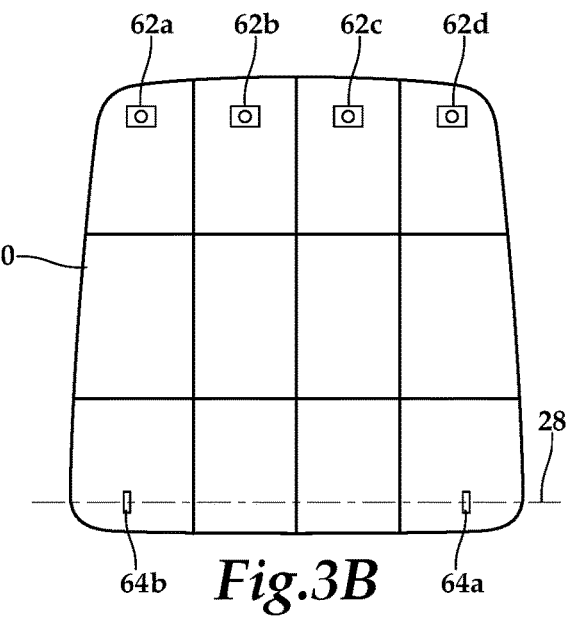
Fig.3A  Fig.3B
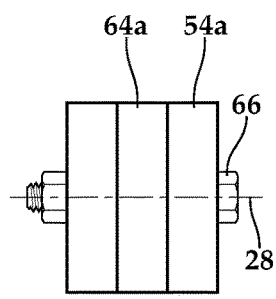 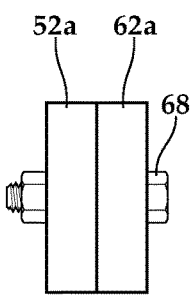 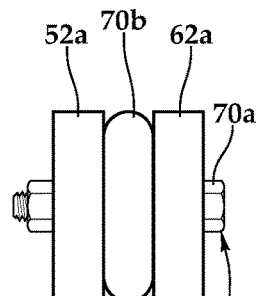 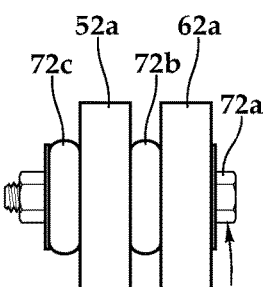
Fig.3C  Fig.3D  Fig.3E  Fig.3F
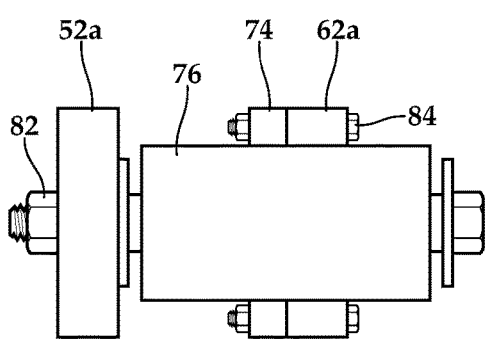 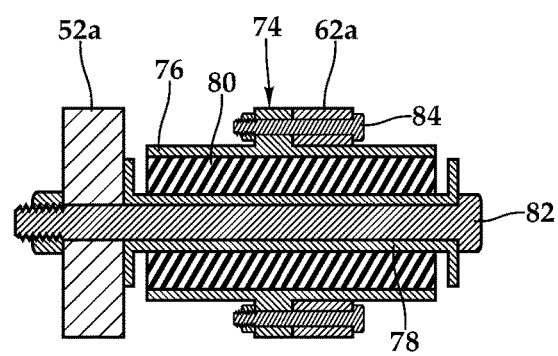
Fig.3G  Fig.3H

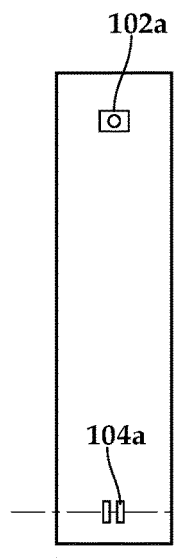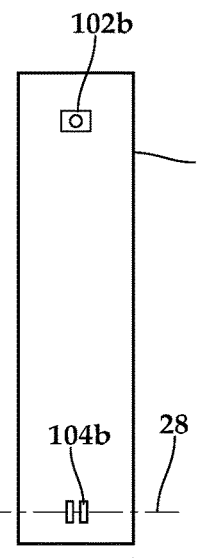
*Fig.4A*  *Fig.4B*
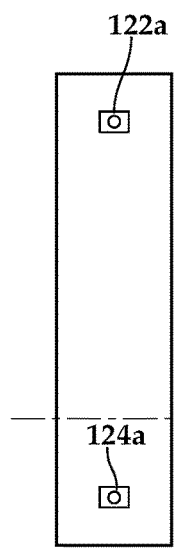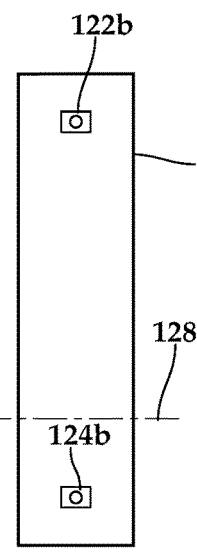
*Fig.5A*  *Fig.5B*

COMPLIANT TAIL STRUCTURE FOR ROTORCRAFT

TECHNICAL FIELD OF THE DISCLOSURE

The present disclosure relates, in general, to tail structure for rotorcraft and, in particular, to compliant tail joints for coupling tail structure to the fuselage of rotorcraft that tailor the contributions of the tail structure to detune the dynamic response of the fuselage from the excitation frequencies generated by the rotating components.

BACKGROUND

Tiltrotor aircraft typically include multiple propulsion assemblies that are positioned near outboard ends of a fixed wing. Each propulsion assembly may include an engine and transmission that provide torque and rotational energy to rotate a proprotor system including a hub assembly and a plurality of proprotor blades. Typically, at least a portion of each propulsion assembly is rotatable relative to the fixed wing such that the proprotor blades have a generally horizontal plane of rotation providing vertical thrust for takeoff, hovering and landing, much like a conventional helicopter, and a generally vertical plane of rotation providing forward thrust for cruising in forward flight with the fixed wing providing lift, much like a conventional propeller driven airplane.

Physical structures have natural frequencies or modes that can be excited by forces applied thereto such as driving forces generated by rotating components. These modes are determined, at least in part, by the materials and geometries of the structures. In the case of tiltrotor aircraft, the dynamic response of the fuselage is sensitive to the contributions of the tail structure. For example, the stiffness of the connection between the tail structure and the fuselage has a large impact on fuselage modes, which must be sufficiently separated from the critical excitation frequencies of 1/rev and n/rev. Attempts have been made to tailor fuselage modes by stiffening airframe structures and/or adjusting mass distributions. It has been found, however, that stiffening of airframe structures for dynamic tuning of fuselage modes can result in a significant weight penalty for the aircraft. In addition, it has been found, that redistribution of masses to achieve meaningful dynamic tuning of fuselage modes requires the use of dedicated tuning masses which again, results in a significant weight penalty for the aircraft.

SUMMARY

In a first aspect, the present disclosure is directed to a compliant tail structure for a rotorcraft having rotating components and a fuselage with an aft portion. The tail structure includes a tail assembly having first and second oppositely disposed tail members. A tail joint connects the tail assembly to the aft portion of the fuselage. The tail joint includes at least four tail mounts configured to establish a nodding axis for the tail assembly. At least two of the tail mounts are resilient tail mounts that are configured to establish a nodding degree of freedom for the tail assembly relative to the fuselage about the nodding axis, thereby detuning dynamic fuselage responses from excitation frequencies generated, for example, by the rotating components, other components within the rotorcraft and/or external loading.

In some embodiments, the tail assembly may be an integrated v-tail assembly. In certain embodiments, the tail assembly may include a tail assembly airframe having a forward airframe member and the aft portion of the fuselage may include an aft airframe member such that the tail joint connects the forward airframe member of the tail assembly to the aft airframe member of the fuselage. In such embodiments, the tail joint may connect the forward airframe member of the tail assembly to the aft airframe member of the fuselage at an angle of between 45 degree and 0 degrees from vertical, at an angle of between 30 degree and 15 degrees from vertical or an angle of between 25 degree and 20 degrees from vertical.

In some embodiments, the at least four tail mounts may include two upper tail mounts and two lower tail mounts. In such embodiments, the two upper tail mounts may be the resilient tail mounts and the two lower tail mounts may be non-resilient tail mounts such that the nodding axis is a fixed nodding axis defined by the non-resilient tail mounts. Alternatively, the two upper tail mounts and the two lower tail mounts may be the resilient tail mounts such that the nodding axis is a virtual nodding axis. In certain embodiments, the resilient tail mounts may be substantially horizontally oriented tail mounts.

In some embodiments, the tail assembly may include a tail assembly airframe having a lower airframe member and the aft portion of the fuselage may include an upper airframe member such that the tail joint connects the lower airframe member of the tail assembly to the upper airframe member of the fuselage. In certain embodiments, the tail joint may connect the lower airframe member of the tail assembly to the upper airframe member of the fuselage substantially horizontally. In some embodiments, the at least four tail mounts may include two forward tail mounts and two aft tail mounts. In such embodiments, the two forward tail mounts may be the resilient tail mounts and the two aft tail mounts may be non-resilient tail mounts such that the nodding axis is a fixed nodding axis defined by the non-resilient tail mounts. Alternatively, the two forward tail mounts and the two aft tail mounts may be the resilient tail mounts such that the nodding axis is a virtual nodding axis. In certain embodiments, the resilient tail mounts may be substantially vertically oriented tail mounts. In some embodiments, the resilient tail mounts may be tension tail mounts. In certain embodiments, the resilient tail mounts may be elastomeric tail mounts.

In a second aspect, the present disclosure is directed to a rotorcraft. The rotorcraft includes a fuselage with an aft portion and at least one rotor assembly rotatably coupled to the fuselage that is configured to provide at least vertical thrust. A tail assembly has first and second oppositely disposed tail members. A tail joint connects the tail assembly to the aft portion of the fuselage. The tail joint includes at least four tail mounts configured to establish a nodding axis for the tail assembly. At least two of the tail mounts are resilient tail mounts that are configured to establish a nodding degree of freedom for the tail assembly relative to the fuselage about the nodding axis, thereby detuning dynamic fuselage responses from excitation frequencies generated, for example, by the rotating components, other components within the rotorcraft and/or external loading.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIGS. 2A-2B are isometric and exploded views of a compliant tail structure for a tiltrotor aircraft in accordance with embodiments of the present disclosure;

FIGS. 3A-3H are schematic illustrations of component parts of a tail joint of a compliant tail structure for a tiltrotor aircraft in accordance with embodiments of the present disclosure;

FIGS. 4A-4B are schematic illustrations of component parts of a tail joint of a compliant tail structure for a tiltrotor aircraft in accordance with embodiments of the present disclosure;

FIGS. 5A-5B are schematic illustrations of component parts of a tail joint of a compliant tail structure for a tiltrotor aircraft in accordance with embodiments of the present disclosure;

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those having ordinary skill in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction. As used herein, the term "coupled" may include direct or indirect coupling by any means, including by mere contact or by moving and/or non-moving mechanical connections.

Figure 1A:
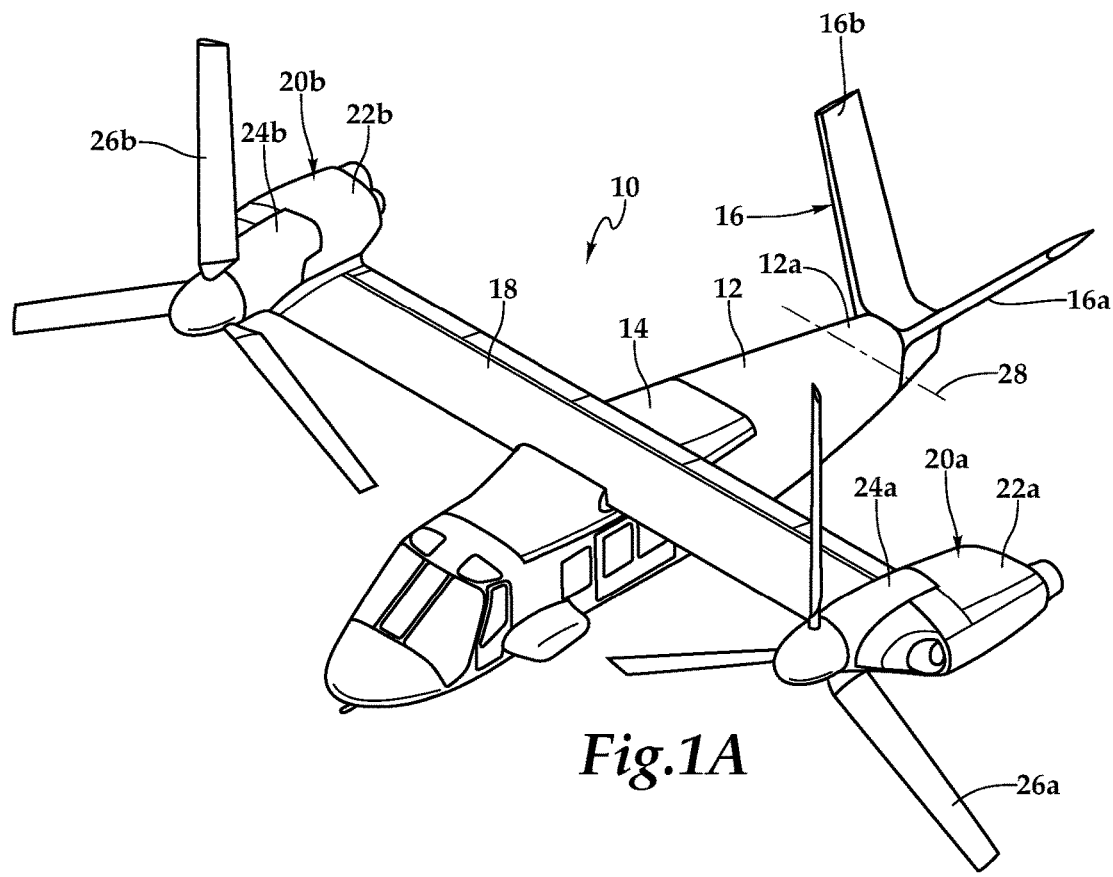
FIGS. 1A-1B are schematic illustrations of a tiltrotor aircraft having a compliant tail structure in accordance with embodiments of the present disclosure.
Figure 1B:
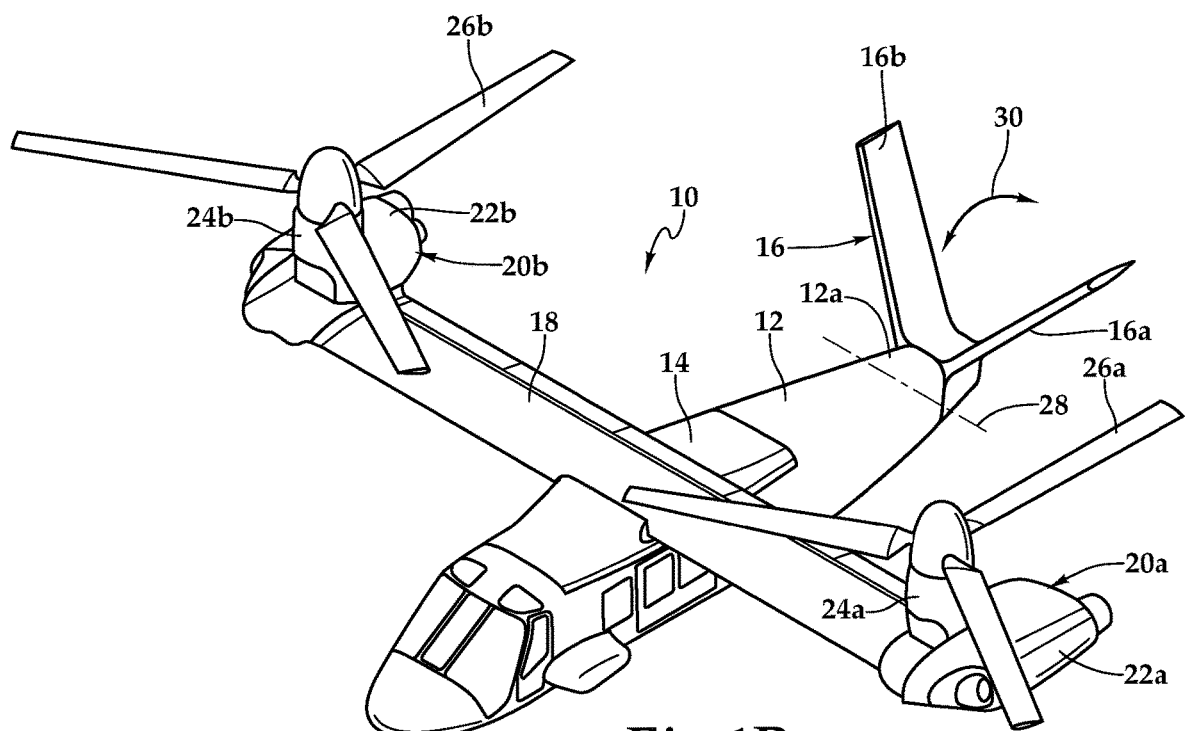

Referring to FIGS. 1A-1B in the drawings, a rotorcraft depicted as a tiltrotor aircraft having a compliant tail structure is schematically illustrated and generally designated 10. Tiltrotor aircraft 10 includes a fuselage 12 having an aft portion 12a, a wing mount assembly 14 and a unitized empennage depicted as a tail assembly 16 that includes two oppositely disposed tail members 16a, 16b in the form of an integrated v-tail assembly. Tail members 16a, 16b provide horizontal and/or vertical stabilization during forward flight and may have one or more controllable surfaces that may act as rudders and/or elevators. A wing member 18 is supported by wing mount assembly 14. Coupled to outboard ends of wing member 18 are propulsion assemblies 20a, 20b.

Propulsion assembly 20a includes a nacelle depicted as fixed pylon 22a that houses an engine and a transmission. In addition, propulsion assembly 20a includes a mast assembly 24a that is rotatable relative to fixed pylon 22a, wing member 18 and fuselage 12 between a generally horizontal orientation, as best seen in FIG. 1A and a generally vertical orientation, as best seen in FIG. 1B. Propulsion assembly 20a also includes a proprotor assembly 26a, including a rotor hub assembly with three proprotor blade assemblies radiating therefrom, which is rotatable responsive to torque and rotational energy provided via a drive system mechanically coupled to the engine and transmission housed by fixed pylon 22a. Similarly, propulsion assembly 20b includes a nacelle depicted as fixed pylon 22b that houses an engine and transmission and a mast assembly 24b that is rotatable relative to fixed pylon 22b, wing member 18 and fuselage 12. Propulsion assembly 20b also includes a proprotor assembly 26b, including a rotor hub assembly with three proprotor blade assemblies radiating therefrom, which is rotatable responsive to torque and rotational energy provided via a drive system mechanically coupled to the engine and transmission housed by fixed pylon 22b.

FIG. 1A illustrates tiltrotor aircraft 10 in airplane or forward flight mode, in which proprotor assemblies 26a, 26b are rotating in a substantially vertical plane to provide a forward thrust enabling wing member 18 to provide a lifting force responsive to forward airspeed, such that tiltrotor aircraft 10 flies much like a conventional propeller driven aircraft. FIG. 1B illustrates tiltrotor aircraft 10 in helicopter or vertical takeoff and landing (VTOL) flight mode, in which proprotor assemblies 26a, 26b are rotating in a substantially horizontal plane to provide a lifting thrust, such that tiltrotor aircraft 10 flies much like a conventional helicopter. It should be appreciated that tiltrotor aircraft 10 can be operated such that proprotor assemblies 26a, 26b are selectively positioned between forward flight mode and VTOL flight mode, which can be referred to as a conversion flight mode. Even though tiltrotor aircraft 10 has been described as having one engine in each fixed pylon 22a, 22b, it should be understood by those having ordinary skill in the art that other engine arrangements are possible and are considered to be within the scope of the present disclosure including, for example, having a single engine which may be housed within fuselage 12 that provides torque and rotational energy to both proprotor assemblies 26a, 26b.

During the design and development phase of tiltrotor aircraft, considerable attention is given to ensuring that the natural frequencies of major airframe components and assemblies are sufficiently separated from the excitation frequencies of the driving forces generated by the rotating components. This process not only ensures that the dynamic environment of the aircraft is acceptable for passengers and crew but also, that the aircraft components can operate together safely and have adequate fatigue life. In the case of tiltrotor aircraft, the frequency placement of the fuselage is important as the natural frequencies of the fuselage must be sufficiently separated from the critical excitation frequencies of 1/rev and n/rev generated by the rotor assemblies. One factor that has a large impact on the dynamic response of the fuselage is the contribution of the tail structure. For example, the stiffness or compliance of the connection between the tail structure and the fuselage has a large impact on the natural modes of interest of the fuselage. In the present embodiments, favorable changes in the modal frequencies or dynamic response of the fuselage can be achieved by using resilient mounts in the tail joint between the tail assembly and the fuselage to alter the natural frequencies of the fuselage from the critical excitation frequencies generated by the rotor assemblies. In other word, the use of resilient mounts in the tail joint between the tail assembly and the fuselage enables the fuselage to be detuned from the driving frequencies of the rotor assemblies and/or the dynamic response of the tail assembly can be decoupled from fuselage bending frequencies.

In the present embodiments, this is achieved by attaching tail assembly 16 to the aft end 12a of fuselage 12 with a tail joint that includes a plurality of tail mounts that are configured to establish a nodding axis 28 for tail assembly 16. At least some of the plurality of tail mounts are resilient tail mounts that are configured to establish a nodding degree of freedom in the fore/aft direction for tail assembly 16 relative to fuselage 12 about nodding axis 28, as indicated by arrow 30. By adjusting the stiffness of the resilient tail mounts, the nodding degree of freedom of tail assembly 16 can be tailored to provide the desired detuning of the modal frequencies of fuselage 12. For example, after shake tests and/or flight tests, if it is determined that the modal frequencies of fuselage 12 are too close to the driving frequencies generated by propulsion assemblies 20a, 20b, resilient tail mounts having a different stiffness may be used within the tail joint of the present disclosure to detune the dynamic response of fuselage 12 away from these driving frequencies.

It should be appreciated that tiltrotor aircraft 10 is merely illustrative of a variety of aircraft that can implement the embodiments disclosed herein. Indeed, a compliant tail structure may be implemented on any aircraft. Other aircraft implementations can include hybrid aircraft, tiltwing aircraft, quad tiltrotor aircraft, helicopters, unmanned aircraft, gyrocopters, propeller-driven airplanes, compound helicopters, drones, jets and the like. As such, those having ordinary skill in the art will recognize that a compliant tail structure can be integrated into a variety of aircraft configurations. It should be appreciated that even though aircraft are particularly well-suited to implement the embodiments of the present disclosure, non-aircraft vehicles and devices can also implement the embodiments.

Referring to FIGS. 2A-2B in the drawings, a compliant tail structure for a rotorcraft is schematically illustrated and generally designated 40. In the illustrated embodiment, an aft portion 12a of fuselage 12 is shown. Tail assembly 16 is connected to aft end 12a of fuselage 12 with a tail joint 42, a portion of which is visible in the exploded view of FIG. 2B. Tail joint 42 includes a plurality of tail mounts that are configured to establish a nodding axis 28 for tail assembly 16. For example, tail joint 42 may include four tail mounts, six tail mounts, eight tail mounts or other suitable number of tail mounts. In the illustrated embodiment, tail joint 42 includes six tail mounts, four upper tail mounts collectively referred to as tail mounts 44 and two lower tail mounts collectively referred to as tail mounts 46. Upper tail mounts 44 are resilient tail mounts, as indicated by the spring symbol, designed specifically to provide the required frequency placement and/or damping characteristics to achieve the desired fuselage modes. Tail mounts 46 are non-resilient tail mounts, as indicted by the link symbol, designed specifically to provide a rotational interface between tail assembly 16 and fuselage 12 about nodding axis 28. Since fore/aft movement between tail assembly 16 and fuselage 12 is prevented by lower tail mounts 46 and is allowed by upper tail mounts 44, tail assembly 16 has a nodding degree of freedom relative to fuselage 12, as indicated by arrow 30.

As illustrated, tail joint 42 connects tail assembly 16 to fuselage 12 at an angle 48 from vertical. In one example, angle 48 may be between 45 degree and 0 degrees from vertical. In another example, angle 48 may be between 30 degree and 15 degrees from vertical. In a further example, angle 48 may be between 25 degree and 20 degrees from vertical. In the illustrated embodiment, even though tail joint 42 connects tail assembly 16 to fuselage 12 at angle 48, upper resilient tail mounts 44 are horizontally oriented. In other embodiments, upper resilient tail mounts 44 could be at an angle from the horizontal such as between 45 degree and 0 degrees, between 30 degree and 15 degrees or between 25 degree and 20 degrees including angles that are congruent with or noncongruent with angle 48.

Tail joint 42 will now be discussed in greater detail with reference to FIGS. 3A-3H. FIG. 3A depicts an aft airframe member 50 of the aft portion 12a of fuselage 12. Aft airframe member 50 includes four upper attachment points 52a, 52b, 52c, 52d each having an opening therethrough that preferably extends in a horizontal direction and normal to the surface of the respective attachment point. Aft airframe member 50 also includes two lower attachment points 54a, 54b in the form of female clevises with each clevis arm having an opening therethrough, not visible in the figures, that is centered about nodding axis 28 when tail joint 42 is fully assembled. FIG. 3B depicts a forward airframe member 60 of tail assembly 16. Forward airframe member 60 includes four upper attachment points 62a, 62b, 62c, 62d each having an opening therethrough that preferably extends in a horizontal direction and normal to the surface of the respective attachment point. Forward airframe member 60 also includes two lower attachment points 64a, 64b in the form of male clevises with each clevis arm having an opening therethrough, not visible in the figures, that is centered about nodding axis 28 when tail joint 42 is fully assembled.

In the illustrated embodiment, upper attachment points 52a, 52b, 52c, 52d of aft airframe member 50 correspond with upper attachment points 62a, 62b, 62c, 62d of forward airframe member 60 and are coupled together to form part of tail joint 42. Likewise, lower attachment points 54a, 54b of aft airframe member 50 correspond with lower attachment points 64a, 64b of forward airframe member 60 and are coupled together to form part of tail joint 42. Tail joint 42 is formed by connecting corresponding attachment points of aft airframe member 50 and forward airframe member 60 with resilient and non-resilient tail mounts. For example, FIG. 3C depicts female clevis attach point 54a aligned with male clevis attachment point 64a along nodding axis 28 and secured together with a non-resilient tail mount 66 depicted as a bolt operating in shear in the horizontal load direction that extends through the openings of attach points 54a, 64a to define a fixed nodding axis. In other embodiments, non-resilient tail mount 66 could be a pin or other suitable cylindrical member. Non-resilient tail mount 66 prevents relative fore/aft movement between attach point 54a and attachment point 64a but allows relative rotation therebetween about nodding axis 28. In this manner, non-resilient tail mount 66 provides a stiff or non-resilient coupling in the horizontal load direction. Similarly, a non-resilient tail mount couples female clevis attach point 54b with male clevis attachment point 64b along nodding axis 28 creating a rotatable coupling that is non-resilient in the horizontal load direction.

Depending upon the desired stiffness of tail joint 42, one of several types of resilient tail mounts may be used to couple corresponding upper attachment points of aft airframe member 50 and forward airframe member 60. For example, FIG. 3D depicts a resilient tail mount 68 in the form of a tension tail mount that is depicted as a bolt coupling upper attachment point 52a of aft airframe member 50 with upper attachment point 62a of forward airframe member 60. In the illustrated embodiment, resilient tail mount 68 is precisely torqued such that resilient tail mount 68 remains in tension with upper attachment point 52a and upper attachment point 62a being in compression against one another under all expected tail load conditions. As resilient tail mount 68 is aligned with the horizontal load direction, the material of upper attachment point 52a and upper attachment point 62a and/or resilient tail mount 68 provides tail assembly 16 with a certain nodding degree of freedom. Similar resilient tail mounts may couple each of the other corresponding upper attachment points of aft airframe member 50 and forward airframe member 60. As discussed herein, the nodding degree of freedom of tail assembly 16 provides detuning of the dynamic responses of fuselage 12 from the excitation frequencies generated by the rotating components of the rotorcraft.

If greater detuning is required, elastomeric elements may be used to form the resilient tail mounts. For example, FIG. 3E depicts a resilient tail mount 70 in the form of a tension tail mount that is depicted as a bolt 70a and an elastomer pad 70b disposed between upper attachment point 52a of aft airframe member 50 and upper attachment point 62a of forward airframe member 60. In the illustrated embodiment, resilient tail mount 70 is precisely torqued such that resilient tail mount 70 remains in tension with upper attachment point 52a, elastomer pad 70b and upper attachment point 62a being in compression under all expected tail load conditions. As resilient tail mount 70 is aligned with the horizontal load direction, resilient tail mount 70 provides tail assembly 16 with the desired nodding degree of freedom. Similar resilient tail mounts may couple each of the other corresponding upper attachment points of aft airframe member 50 and forward airframe member 60.

In another example, FIG. 3F depicts a resilient tail mount 72 in the form of a tension tail mount that is depicted as a bolt 72a and two elastomer pads 72b, 72c disposed on either side of upper attachment point 52a of aft airframe member 50 with elastomeric pad 72 be positioned between upper attachment point 52a of aft airframe member 50 and upper attachment point 62a of forward airframe member 60. In the illustrated embodiment, resilient tail mount 72 is precisely torqued such that resilient tail mount 72 remains in tension with elastomer pad 72c, upper attachment point 52a, elastomeric pad 72b and upper attachment point 62a being in compression under all expected tail load conditions. As resilient tail mount 72 is aligned with the horizontal load direction, resilient tail mount 72 provides tail assembly 16 with the desired nodding degree of freedom. Similar resilient tail mounts may couple each of the other corresponding upper attachment points of aft airframe member 50 and forward airframe member 60.

In a further example, FIGS. 3G-3H depict a resilient tail mount 74 in the form of an elastomeric tail mount. In the illustrated embodiment, resilient tail mount 74 includes an outer housing 76 and an inner sleeve 78 with at least one elastomeric element 80 coupled therebetween. Elastomeric element 80 may be a single annular elastomeric element, may be multiple segmented annular elastomeric elements, may be multiple partially annular elastomeric elements, may including multiple elastomeric layers with metal shims therebetween, may be formed from multiple conical sections or may have other suitable designs. The durometer and thickness of the elastomeric materials may be tailored to achieve the desired operational modes based upon the loads and motions expected in the particular application. Resilient tail mount 74 is coupled to upper attachment point 52a of aft airframe member 50 with a single bolt 82 and to upper attachment point 62a of forward airframe member 60 with a plurality of bolts 84. In the illustrated embodiment, resilient tail mount 74 is aligned with the horizontal load direction such that elastomeric element 80 functions in shear deformation caused by varying compression loads generated by the nodding degree of freedom of tail assembly 16. Similar resilient tail mounts may couple each of the other corresponding upper attachment points of aft airframe member 50 and forward airframe member 60.

Even though tail joint 42 has been described as having six tail mounts, it should be understood by those having ordinary skill in the art that a tail joint of the present disclosure could have other numbers of tail mounts both greater than or less than six. For example, an alternate tail joint will now be discussed with reference to FIGS. 4A-4B. FIG. 4A depicts two beams of an aft airframe member 100 of the aft portion 12a of fuselage 12. Aft airframe member 100 includes two upper attachment points 102a, 102b each having an opening therethrough that preferably extends in a horizontal direction and normal to the surface of the respective attachment point. Aft airframe member 100 also includes two lower attachment points 104a, 104b in the form of female clevises with each clevis arm having an opening therethrough, not visible in the figures, that is centered about nodding axis 28 when the tail joint is fully assembled. FIG. 4B depicts a forward airframe member 110 of tail assembly 16. Forward airframe member 110 includes two upper attachment points 112a, 112b each having an opening therethrough that preferably extends in a horizontal direction and normal to the surface of the respective attachment point. Forward airframe member 110 also includes two lower attachment points 114a, 114b in the form of male clevises with each clevis arm having an opening therethrough, not visible in the figures, that is centered about nodding axis 28 when the tail joint is fully assembled.

In the illustrated embodiment, upper attachment points 102a, 102b of aft airframe member 100 correspond with upper attachment points 112a, 112b of forward airframe member 110 and are coupled together to form part of the tail joint. Likewise, lower attachment points 104a, 104b of aft airframe member 100 correspond with lower attachment points 114a, 114b of forward airframe member 110 and are coupled together to form part of the tail joint. The tail joint is formed by connecting corresponding attachment points of aft airframe member 100 and forward airframe member 100 with resilient and non-resilient tail mounts. For example, the lower attachment points of aft airframe member 100 and forward airframe member 110 are aligned along nodding axis 28 and secured together with a non-resilient tail mount such as non-resilient tail mount 66 of FIG. 3C to define a fixed nodding axis and to create a rotatable coupling that is non-resilient in the horizontal load direction. Depending upon the desired stiffness of the tail joint, one of several types of resilient tail mounts may be used to couple corresponding upper attachment points of aft airframe member 100 and forward airframe member 110 including, for example, the resilient tail mounts disclosed herein in FIGS. 3D-3H.

Even though the disclosed tail joints have been described as having a fixed nodding axis, it should be understood by those having ordinary skill in the art that a tail joint of the present disclosure could have a virtual nodding axis. For example, another alternate tail joint will now be discussed with reference to FIGS. 5A-5B. FIG. 5A depicts two beams of an aft airframe member 120 of the aft portion 12a of fuselage 12. Aft airframe member 120 includes two upper attachment points 122a, 122b and two lower attachment points 124a, 124b each having an opening therethrough that preferably extends in a horizontal direction and normal to the surface of the respective attachment point. FIG. 5B depicts a forward airframe member 130 of tail assembly 16. Forward airframe member 130 includes two upper attachment points 132a, 132b and two lower attachment points 134a, 134b each having an opening therethrough that preferably extends in a horizontal direction and normal to the surface of the respective attachment point.

In the illustrated embodiment, upper attachment points 122a, 122b of aft airframe member 120 correspond with upper attachment points 132a, 132b of forward airframe member 120 and are coupled together to form part of the tail joint. Likewise, lower attachment points 124a, 124b of aft airframe member 120 correspond with lower attachment points 134a, 134b of forward airframe member 130 and are coupled together to form part of the tail joint. The tail joint is formed by connecting corresponding attachment points of aft airframe member 120 and forward airframe member 130 with resilient tail mounts. Depending upon the desired stiffness of the tail joint and the desired location of the virtual nodding axis, one or more of several types of resilient tail mounts may be used to couple corresponding attachment points of aft airframe member 120 and forward airframe member 130. For example, each of the corresponding upper and lower attachment points of aft airframe member 120 and forward airframe member 130 could use the same type of resilient tail mounts such as any one of the resilient tail mounts disclosed herein in FIGS. 3D-3H. Alternatively, it may be desired to have resilient tail mounts that are stiffer in the corresponding lower attachment points as compared to the upper attachment points of aft airframe member 120 and forward airframe member 130. For example, corresponding lower attachment points may utilize resilient tail mounts 68 of FIG. 3D while corresponding upper attachment points may utilize resilient tail mounts 74 of FIGS. 3G-3H. Using stiffer resilient tail mounts for the lower attachment points as compared to the upper attachment points tends to locate the virtual nodding axis 128 closer to the lower attachment points than the upper attachment points as depicted in FIGS. 5A-5B.

Figure 6A:
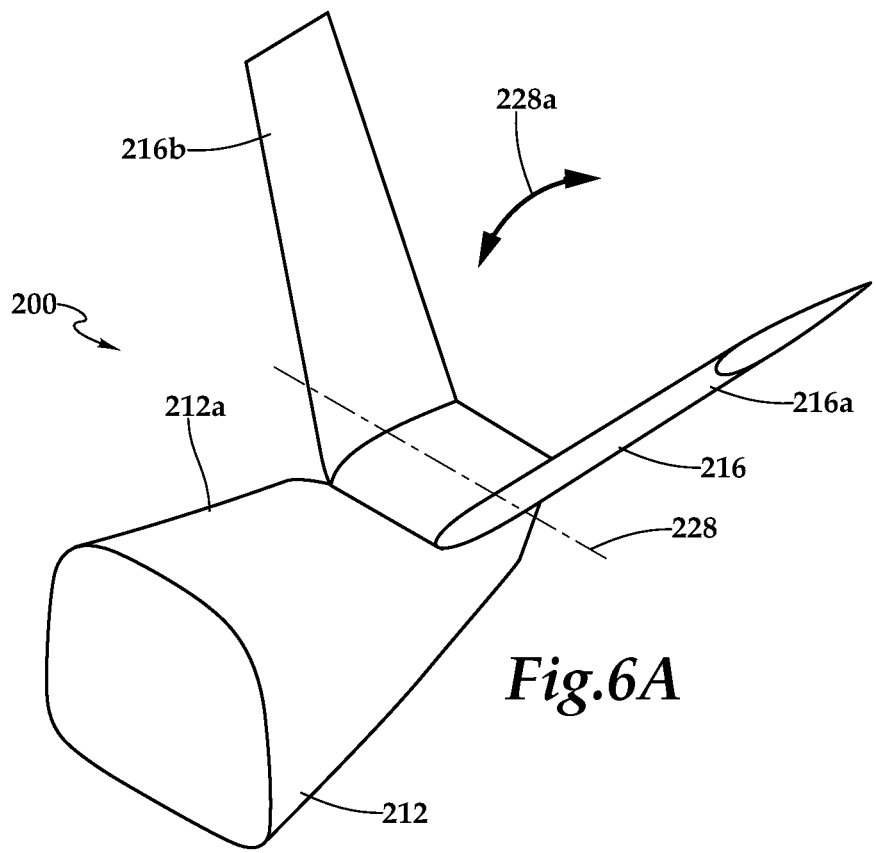
FIGS. 6A-6B are isometric and exploded views of a compliant tail structure for a tiltrotor aircraft in accordance with embodiments of the present disclosure.
Figure 6B:
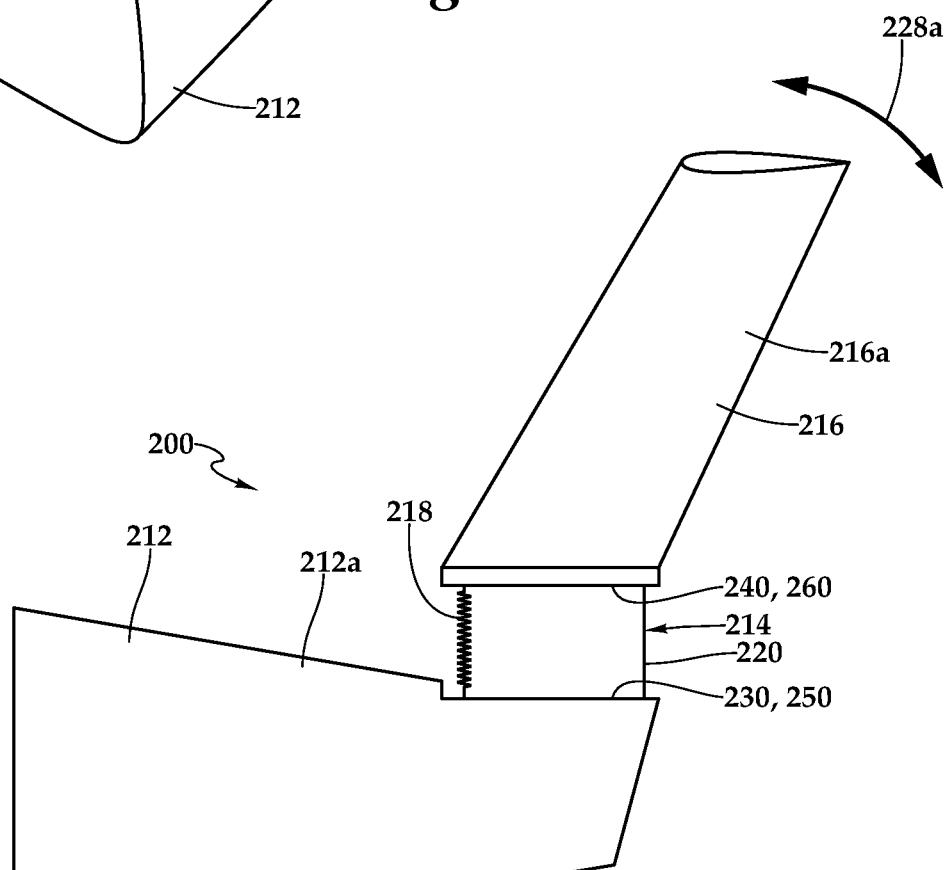

Referring to FIGS. 6A-6B in the drawings, a compliant tail structure for a rotorcraft is schematically illustrated and generally designated 200. In the illustrated embodiment, an aft portion 212a of fuselage 212 is shown. A unitized empennage depicted as a tail assembly 216 that includes two oppositely disposed tail members 216a, 216b in the form of an integrated v-tail assembly is connected to aft end 212a of fuselage 212 with a tail joint 214, a portion of which is visible in the exploded view of FIG. 6B. Tail joint 214 includes a plurality of tail mounts that are configured to establish a nodding axis 228 for tail assembly 216. For example, tail joint 214 may include four tail mounts, six tail mounts, eight tail mounts or other suitable number of tail mounts. In the illustrated embodiment, tail joint 214 includes four tail mounts, two forward tail mounts collectively referred to as tail mounts 218 and two aft tail mounts collectively referred to as tail mounts 220. Forward tail mounts 218 are resilient tail mounts, as indicated by the spring symbol, designed specifically to provide the required frequency placement and/or damping characteristics to achieve the desired fuselage modes. Aft tail mounts 220 are non-resilient tail mounts, as indicted by the link symbol, designed specifically to provide a rotational interface between tail assembly 216 and fuselage 212 about nodding axis 228. Since vertical movement between tail assembly 216 and fuselage 212 is prevented by aft tail mount 220 and is allowed by forward tail mounts 218, tail assembly 216 has a nodding degree of freedom relative to fuselage 212, as indicated by arrow 228a. As illustrated, tail joint 214 connects tail assembly 216 to fuselage 212 in a generally or substantially horizonal orientation. In other embodiments, tail assembly 216 could be coupled to fuselage 212 at an angle relative to horizontal.

Figure 7A:
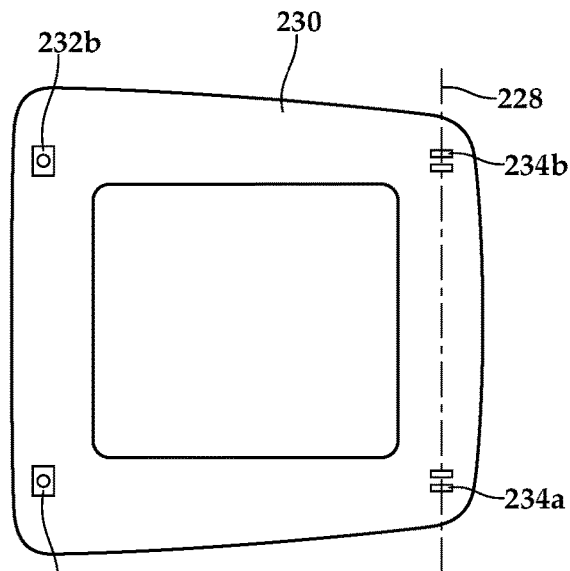
FIGS. 7A-7B are schematic illustrations of component parts of a tail joint of a compliant tail structure for a tiltrotor aircraft in accordance with embodiments of the present disclosure.
Figure 7B:
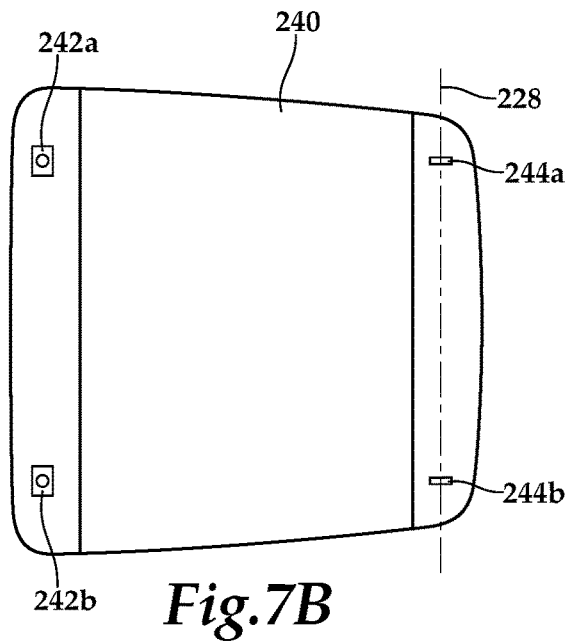

Tail joint 214 will now be discussed in greater detail with reference to FIGS. 7A-7B. FIG. 7A depicts an upper airframe member 230 of the aft portion 212a of fuselage 212. Upper airframe member 230 includes two forward attachment points 232a, 232b each having an opening therethrough that preferably extends in a vertical direction and normal to the surface of the respective attachment point. Upper airframe member 230 also includes two aft attachment points 234a, 234b in the form of female clevises with each clevis arm having an opening therethrough, not visible in the figures, that is centered about nodding axis 228 when tail joint 214 is fully assembled. FIG. 7B depicts a lower airframe member 240 of tail assembly 216. Lower airframe member 240 includes two forward attachment points 242a, 242b each having an opening therethrough that preferably extends in a vertical direction and normal to the surface of the respective attachment point. Lower airframe member 240 also includes two aft attachment points 244a, 244b in the form of male clevises with each clevis arm having an opening therethrough, not visible in the figures, that is centered about nodding axis 228 when tail joint 214 is fully assembled.

In the illustrated embodiment, forward attachment points 232a, 232b of upper airframe member 230 correspond with forward attachment points 242a, 242b of lower airframe member 240 and are coupled together to form part of tail joint 214. Likewise, aft attachment points 234a, 234b of upper airframe member 230 correspond with aft attachment points 244a, 244b of lower airframe member 240 and are coupled together to form part of tail joint 214. Tail joint 214 is formed by connecting corresponding attachment points of upper airframe member 230 and lower airframe member 240 with resilient and non-resilient tail mounts. For example, the corresponding aft attachment points of upper airframe member 230 and lower airframe member 240 are aligned along nodding axis 228 and secured together with a non-resilient tail mount such as non-resilient tail mount 66 of FIG. 3C to define a fixed nodding axis and to create a rotatable coupling that is non-resilient in the vertical load direction. Depending upon the desired stiffness of tail joint 214, one of several types of resilient tail mounts may be used to couple corresponding forward attachment points of upper airframe member 230 and lower airframe member 240 including, for example, the resilient tail mounts disclosed herein in FIGS. 3D-3H. With the resilient tail mounts aligned in the vertical load direction, tail assembly 216 is provided with the desired nodding degree of freedom. As discussed herein, the nodding degree of freedom of tail assembly 216 provides detuning of the dynamic responses of fuselage 212 from the excitation frequencies generated by the rotating components of the rotorcraft.

Figure 8A:
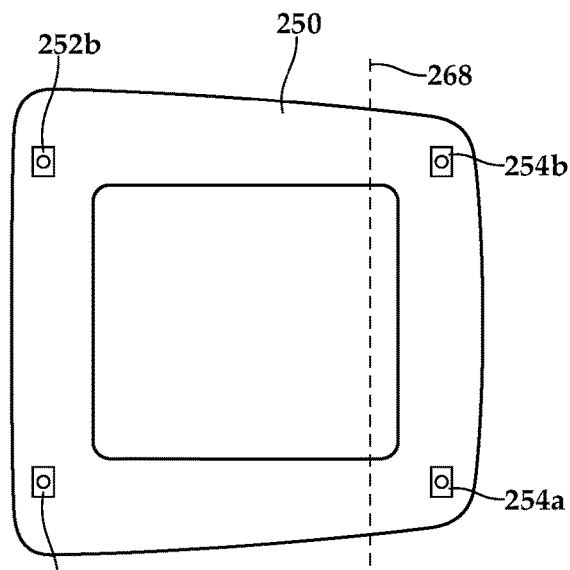
FIGS. 8A-8B are schematic illustrations of component parts of a tail joint of a compliant tail structure for a tiltrotor aircraft in accordance with embodiments of the present disclosure.
Figure 8B:
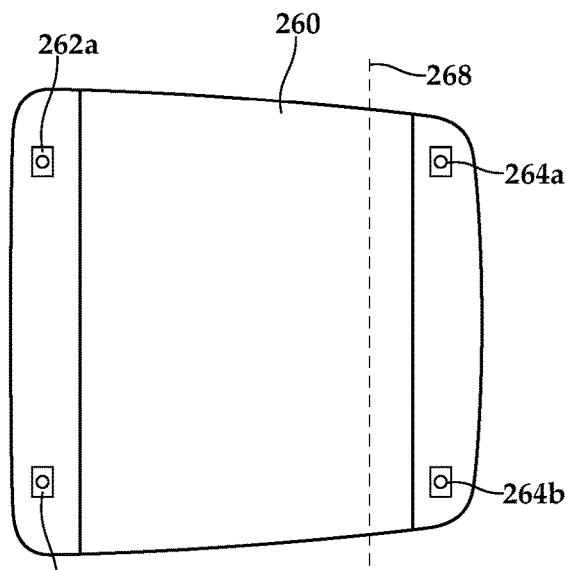

Even though tail joint 214 has been described as having a fixed nodding axis, it should be understood by those having ordinary skill in the art that a horizonal tail joint of the present disclosure could have a virtual nodding axis. For example, an alternate tail joint will now be discussed with reference to FIGS. 8A-8B. FIG. 8A depicts an upper airframe member 250 of the aft portion 212a of fuselage 212. Upper airframe member 250 includes two forward attachment points 252a, 252b and two aft attachment points 254a, 254b each having an opening therethrough that preferably extends in a vertical direction and normal to the surface of the respective attachment point. FIG. 8B depicts a lower airframe member 260 of tail assembly 216. Lower airframe member 260 includes two forward attachment points 262a, 262b and two aft attachment points 264a, 264b each having an opening therethrough that preferably extends in a vertical direction and normal to the surface of the respective attachment point.

In the illustrated embodiment, forward attachment points 252a, 252b of upper airframe member 250 correspond with forward attachment points 262a, 262b of lower airframe member 260 and are coupled together to form part of the tail joint. Likewise, aft attachment points 254a, 254b of upper airframe member 250 correspond with aft attachment points 264a, 264b of lower airframe member 260 and are coupled together to form part of the tail joint. The tail joint is formed by connecting corresponding attachment points of upper airframe member 250 and lower airframe member 260 with resilient tail mounts. Depending upon the desired stiffness of the tail joint and the desired location of the virtual nodding axis, one or more of several types of resilient tail mounts may be used to couple the corresponding attachment points. For example, each of the corresponding forward and aft attachment points of upper airframe member 250 and lower airframe member 260 could use the same type of resilient tail mounts such as any one of the resilient tail mounts disclosed herein in FIGS. 3D-3H. Alternatively, it may be desired to have resilient tail mounts that are stiffer in the corresponding aft attachment points as compared to the forward attachment points of aft airframe member 250 and forward airframe member 260. For example, corresponding aft attachment points may utilize resilient tail mounts 68 of FIG. 3D while corresponding forward attachment points may utilize resilient tail mounts 74 of FIGS. 3G-3H. Using stiffer resilient tail mounts for the aft attachment points as compared to the forward attachment points tends to locate the virtual nodding axis 268 closer to the aft attachment points than the forward attachment points as depicted in FIGS. 8A-8B.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one having ordinary skill in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons having ordinary skill in the art upon reference to the description. It is, therefore, intended that the appended claims encompass any such modifications or embodiments.

What is claimed is:

1. A compliant tail structure for a rotorcraft having rotating components and a fuselage with an aft portion including an aft airframe member, the tail structure comprising:
   a tail assembly having a tail assembly airframe including a forward airframe member and first and second oppositely disposed tail members; and
   a tail joint connecting the forward airframe member of the tail assembly to the aft airframe member of the aft portion of the fuselage, the tail joint including two upper resilient tail mounts and two lower resilient tail mounts that are configured to establish a virtual nodding axis for the tail assembly between the upper and lower resilient tail mounts;
   wherein, the lower resilient tail mounts are stiffer than the upper resilient tail mounts such that the virtual nodding axis is closer to the lower resilient tail mounts than the upper resilient tail mounts;
   wherein the lower resilient tail mounts are tension tail mounts and the upper resilient tail mounts are elastomeric tail mounts; and
   wherein, the upper and lower resilient tail mounts are configured to establish a nodding degree of freedom for the tail assembly relative to the fuselage about the virtual nodding axis, thereby detuning dynamic fuselage responses from excitation frequencies generated by the rotating components.

2. The compliant tail structure as recited in claim 1 wherein the tail assembly further comprises an integrated v-tail assembly.

3. The compliant tail structure as recited in claim 1 wherein the tail joint connects the forward airframe member of the tail assembly to the aft airframe member of the fuselage at an angle of between 45 degree and 0 degrees from vertical.

4. The compliant tail structure as recited in claim 1 wherein the tail joint connects the forward airframe member of the tail assembly to the aft airframe member of the fuselage at an angle of between 30 degree and 15 degrees from vertical.

5. The compliant tail structure as recited in claim 1 wherein the tail joint connects the forward airframe member of the tail assembly to the aft airframe member of the fuselage at an angle of between 25 degree and 20 degrees from vertical.

6. The compliant tail structure as recited in claim 1 wherein the upper and lower resilient tail mounts further comprise substantially horizontally oriented tail mounts.

7. A rotorcraft comprising:
   a fuselage with an aft portion including an aft airframe member;
   at least one rotor assembly rotatably coupled to the fuselage and configured to provide at least vertical thrust;

a tail assembly having a tail assembly airframe including a forward airframe member and first and second oppositely disposed tail members; and a tail joint connecting the forward airframe member of the tail assembly to the aft airframe member of the aft portion of the fuselage, the tail joint including two upper resilient tail mounts and two lower resilient tail mounts that are configured to establish a virtual nodding axis for the tail assembly between the upper and lower resilient tail mounts;

wherein, the lower resilient tail mounts are stiffer than the upper resilient tail mounts such that the virtual nodding axis is closer to the lower resilient tail mounts than the upper resilient tail mounts;

wherein the lower resilient tail mounts are tension tail mounts and the upper resilient tail mounts are elastomeric tail mounts; and wherein, the upper and lower resilient tail mounts are configured to establish a nodding degree of freedom for the tail assembly relative to the fuselage about the virtual nodding axis, thereby detuning dynamic fuselage responses from excitation frequencies generated by the at least one rotor assembly.

8. The rotorcraft as recited in claim 7 wherein the rotorcraft further comprises a tiltrotor aircraft.

9. The rotorcraft as recited in claim 7 wherein the tail assembly further comprises an integrated v-tail assembly.

10. The rotorcraft as recited in claim 7 wherein the tail joint connects the forward airframe member of the tail assembly to the aft airframe member of the fuselage at an angle of between 45 degree and 0 degrees from vertical.

11. The rotorcraft as recited in claim 7 wherein the tail joint connects the forward airframe member of the tail assembly to the aft airframe member of the fuselage at an angle of between 25 degree and 20 degrees from vertical.

12. The rotorcraft as recited in claim 7 wherein the upper and lower resilient tail mounts further comprise substantially horizontally oriented tail mounts.

\* \* \* \* \*